(12) United States Patent
Chao et al.

(10) Patent No.: US 10,427,806 B2
(45) Date of Patent: Oct. 1, 2019

(54) DEPLOYMENT AND CONTROL ALGORITHMS FOR WHEEL CLUSTER FORMATIONS OF SATELLITES

(71) Applicant: The Aerospace Corporation, El Segundo, CA (US)

(72) Inventors: Chia-Chun Chao, Rolling Hills Estates, CA (US); Victor Shiaw-Jong Lin, Oak Park, CA (US); Siegfried W. Janson, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 245 days.

(21) Appl. No.: 15/593,798

(22) Filed: May 12, 2017

(65) Prior Publication Data
US 2018/0162558 A1 Jun. 14, 2018

Related U.S. Application Data (63) Continuation-in-part of application No. 15/183,384, filed on Jun. 15, 2016, now Pat. No. 9,694,917.

(51) Int. Cl.
| | | |
|---|---|---|
| *B64G 1/10* | (2006.01) | |
| *B64G 3/00* | (2006.01) | |
| *B64G 1/24* | (2006.01) | |
| *B64G 1/26* | (2006.01) | |
| *B64G 1/40* | (2006.01) | |

(52) U.S. Cl.
CPC ............... *B64G 1/242* (2013.01); *B64G 1/10* (2013.01); *B64G 1/1085* (2013.01); *B64G 1/24* (2013.01); *B64G 1/40* (2013.01); *B64G 1/405* (2013.01); *B64G 3/00* (2013.01)

(58) Field of Classification Search
CPC .......... B64G 1/00; B64G 1/10; B64G 1/1085; B64G 1/24; B64G 1/242; B64G 1/40; B64G 3/00; B64G 2001/643; G01S 19/00; G01S 19/02; G01S 19/05
See application file for complete search history.

(56) References Cited

U.S. PATENT DOCUMENTS

| | | |
|---|---|---|
| 5,199,672 A | 4/1993 | King et al. |
| 6,725,012 B1 | 4/2004 | Janson et al. |
| 7,689,358 B2 | 3/2010 | Jaeger et al. |
| 8,016,240 B2 | 9/2011 | Caplin et al. |
| 8,511,617 B2 | 8/2013 | Caplin et al. |
| 9,321,544 B2 | 4/2016 | Thompson et al. |
| 9,694,917 B1* | 7/2017 | Chao .................... B64G 1/1085 |
| 2007/0250267 A1 | 10/2007 | Jaeger et al. |
| 2008/0177430 A1* | 7/2008 | Tekawy ................. B64G 1/242 |
| | | 701/13 |
| 2008/0237399 A1 | 10/2008 | Caplin et al. |

(Continued)

OTHER PUBLICATIONS

Brian Kirkpatrick et al., "Orbit Design for Clustered Satellites", published by the Aerospace Corporation ATM in May 2015.
(Continued)

*Primary Examiner* — Yonel Beaulieu
(74) *Attorney, Agent, or Firm* — LeonardPatel PC (57) ABSTRACT

A control algorithm that determines one or more deviations in an orbit of a companion satellite, and control the companion satellite to minimize effects of perturbing forces.

24 Claims, 10 Drawing Sheets

(56) References Cited

U.S. PATENT DOCUMENTS

2009/0224105 A1* 9/2009 Caplin ................ B64G 1/1085
                                                           244/158.4
2014/0027576 A1   1/2014 Boshuizen et al.
2016/0009425 A1   1/2016 Thompson et al.

OTHER PUBLICATIONS

Chia-Chun Chao, "Applied Orbit Perturbation and Maintenance", Chapter 7, Section 7.3.1 and Chapter 8, Section 8.2.3, published by the Aerospace Press and AIAA Inc. in 2005.
Janson Schmidt, "Satellite Cluster Flight Design Considerations" published during the International Symposium on Space Flight Dynamics in Laurel Maryland on May 2014.
O. Brown et al., "Fractionated Space Architectures: A Vision for Responsive Space" published by Tech. Rep. DTIC in 2006.
Philip J. Bonzell, "Non-Final Office Action", dated Nov. 15, 2016 for U.S. Appl. No. 15/183,384.
Philip J. Bonzell, "Notice of Allowance", dated Mar. 8, 2017 for U.S. Appl. No. 15/183,384.
Philip J. Bonzell, "Restriction Requirement", dated Sep. 27, 2016 for U.S. Appl. No. 15/183,384.
S. Hur-Diaz et al., "Cluster Flight Application on System F6", during the 24th International Symposium on Space Flight Dynamics in Laurel, Maryland in 2014.

* cited by examiner

DEPLOYMENT AND CONTROL ALGORITHMS FOR WHEEL CLUSTER FORMATIONS OF SATELLITES

CROSS-REFERENCE TO RELATED APPLICATION

This Application is a continuation-in-part (CIP) application of, and claims the benefit of, U.S. Non-Provisional application Ser. No. 15/183,384, filed on Jun. 15, 2016, now U.S. Pat. No. 9,694,917, issued on Jul. 4, 2017. The subject matter thereof is hereby incorporated herein by reference in its entirety.

STATEMENT OF GOVERNMENT INTEREST

This invention was made with government support under Contract No. FA8802-09-C-0001 awarded by the Department of the Air Force. The government has certain rights in the invention.

FIELD

The present invention relates to wheel cluster formations, and more particularly, to deployment and control algorithms for satellites in wheel cluster formations.

BACKGROUND

Orbital mechanics of formation flying includes a free flying sparse aperture array. This free flying sparse aperture array includes independent sub-satellites that orbit around a central host spacecraft at nearly constant range to provide an almost constant geometrical configuration with respect to the central host spacecraft. The sub-satellites have similar, but different eccentricities and orbit inclinations, depending on how far the sub-satellites are from the central host spacecraft. While this approach enables almost constant range between the sub-satellites and the central host spacecraft, the approach requires multiple station-keeping burns per orbit to maintain cluster formation against the "$J_2$" effects of Earth's gravity and other perturbing forces such as Sun-moon attractions and atmospheric drag. If the constant range restriction is relaxed, the differences in inclination may be eliminated, thus potentially reducing the station-keeping requirements. This will significantly reduce propellant usage.

Thus, an alternative approach to deploy and control sub-satellites may be beneficial.

SUMMARY

Certain embodiments of the present invention may provide solutions to the problems and needs in the art that have not yet been fully identified, appreciated, or solved by current deployment and control algorithms. For example, in some embodiments, a deployment algorithm may deploy a group of CubeSats or small satellites around a center satellite, and a control algorithm may control or navigate each CubeSat or each small satellite around the center satellite. For purposes of explanation, CubeSat(s) or small satellite(s) will be referred to as satellite(s).

In one embodiment, a process for controlling a companion satellite in a wheel cluster formation. The process includes determining, by at least one processor, one or more deviations in an orbit of a companion satellite, and controlling, by the at least one processor, the companion satellite to minimize effects of perturbing forces.

In another embodiment, an apparatus for controlling a companion satellite in a wheel cluster formation includes memory and at least one processor. The memory includes a set of instructions. The set of instructions with the at least one processor causes the apparatus to determine one or more deviations in an orbit of a companion satellite, and control the companion satellite to minimize effects of perturbing forces.

In yet another embodiment, a computer program for controlling a companion satellite may be embodied on a non-transitory computer-readable medium. The computer program, when executed, is configured to cause an apparatus to determine one or more deviations in an orbit of a companion satellite, and control the companion satellite to minimize effects of perturbing forces.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

One or more embodiments generally pertain to an algorithm for deploying a group of satellites (or companion satellites) around a center satellite. For example, several companion satellites may be placed on slightly different orbits such that each companion satellite moves around a center satellite in a wheel shaped formation. It should be appreciated that there is no maximum or minimum number of companion satellites. However, to prevent collision, the number of companion satellites depends on the closest distance allowed between any two companion satellites and the accuracy of an onboard navigation and station keeping algorithm.

In some embodiments, a deployment algorithm may require simple maneuvers with small orbit eccentricity and argument of perigee changes. This way, closely separated orbits are in the same plane and experience very small differential perturbing forces. In certain embodiments, an optimized control algorithm may be implemented using the onboard propulsion and navigation system of the companion satellites.

Figure 1:
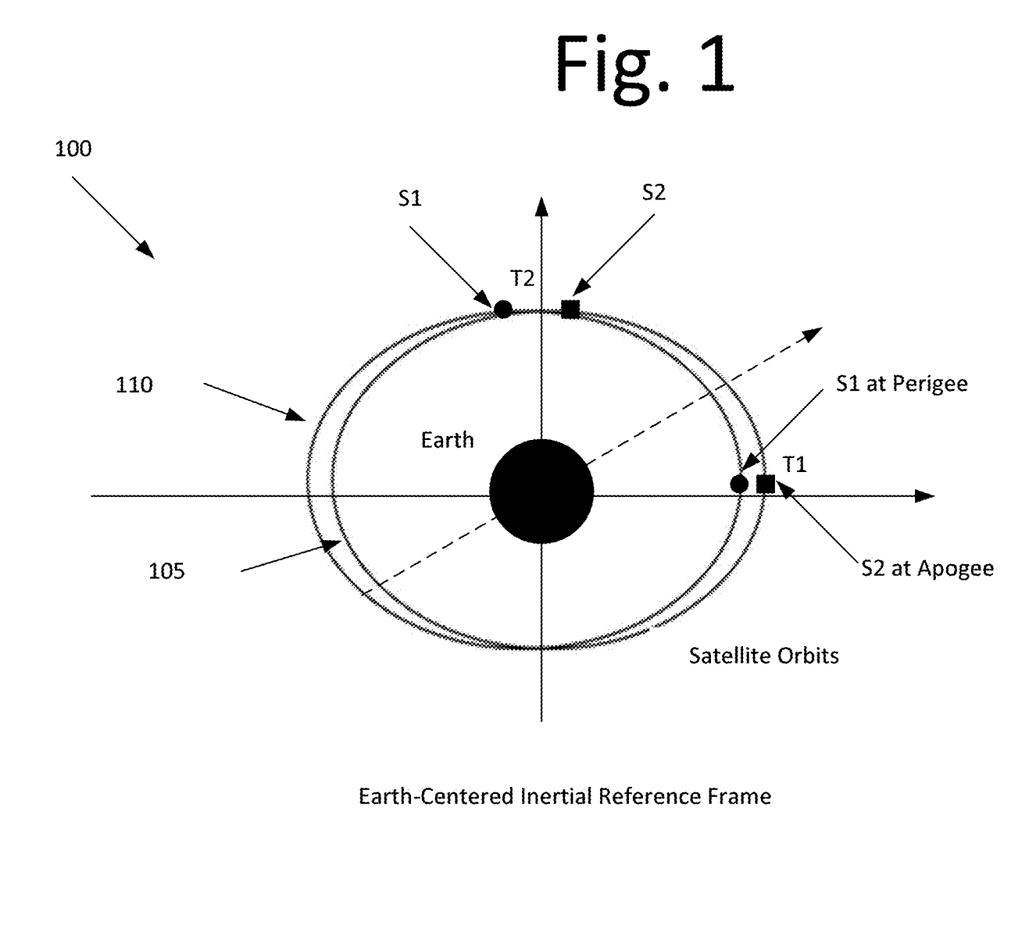
FIG. 1 illustrates a wheel formation with two satellite orbits, according to an embodiment of the present invention.

FIG. 1 illustrates a wheel formation 100 with satellite orbits 105, 110, according to an embodiment of the present invention. In one embodiment, satellite orbits 105, 110 have opposite perigee with the same semi-major axis and eccentricity. For example, wheel formation 100 of FIG. 1 includes two companion satellites S1, S2 moving on two orbits 105, 110 with identical size and shape but with 180 degrees of difference in argument of perigee. In this example, companion satellites S1, S2 at time T1 are near perigee and apogee, respectively, of their orbits 105, 110. In other words, companion satellites S1, S2 are separated by a distance proportional to a small eccentricity ε of the orbits 105, 110 at time T1. In some embodiments, time T1 and time T2 represent the instants when the companion satellites S1, S2 are at perigee/apogee and near 90 degrees past perigee/apogee, respectively.

Due to dynamics of the orbital motion, companion satellites S1, S2 are separated by the largest distance at time T2, which is 90 degrees from where companion satellites S1, S2 were at time T1 in the Earth-centered inertial reference frame. The separation at time T2 is twice the separation at time T1, resulting in an elliptical sub-orbit in the relative, co-rotating (or satellite-centered) reference frame in FIG. 2. For example, if the separation at time T1 is 5 kilometers, then at time T2, the separation is 10 kilometers.

Figure 2:
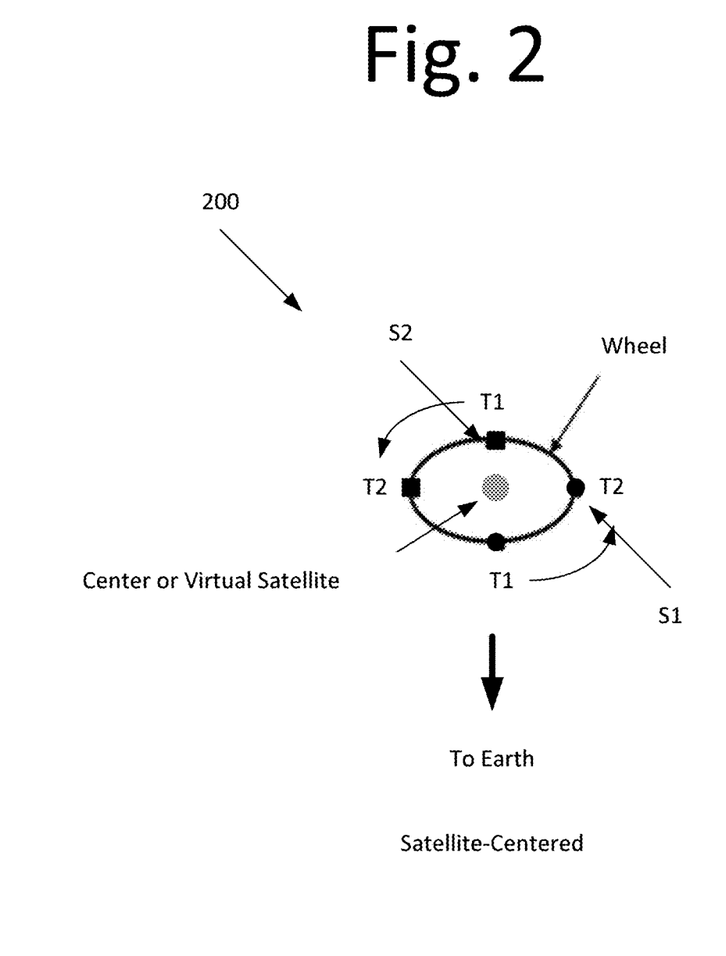
FIG. 2 illustrates a path of relative motion, according to an embodiment of the present invention.

FIG. 2 illustrates a path 200 of relative motion, according to an embodiment of the present invention. In one embodiment, the companion satellites S1, S2 achieve a formation that circulates around a sub-orbit equal to a common orbital period of companion satellites S1, S2. The wheel cluster formation in some embodiments allows multiple companion satellites S1, S2 to fly around a central (or mother) satellite 205 in the center of the wheel cluster formation. In some embodiments, this may be a virtual, or non-physical satellite.

Figure 3:
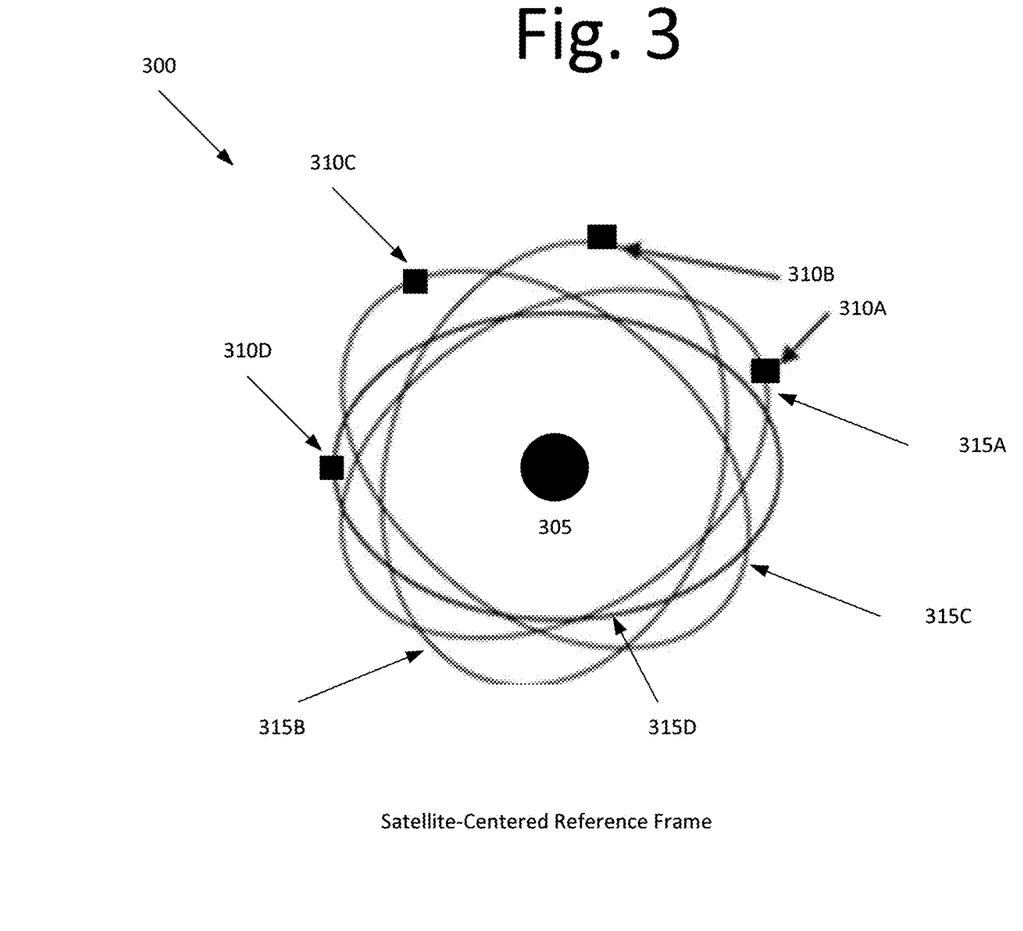
FIG. 3 illustrates a wheel cluster formation with four satellites, according to an embodiment of the present invention.

FIG. 3 illustrates a wheel cluster formation 300 with four companion satellites 310A-D, according to an embodiment of the present invention. In one embodiment, companion satellites 310A-D move along four wheel sub-orbits 315A-D, and the center (or mother) satellite 305 is the middle of wheel sub-orbits 315A-D. Center satellite 305 may move on a circular orbit or an elliptical orbit about the Earth.

Each companion satellite 310A-D may move on an orbit with a small change in eccentricity and argument of perigee. In some embodiments, each wheel sub-orbit 315A-D may be rotated by a small angle. It should be appreciated that in certain embodiments each wheel sub-orbit 315A-D is an ellipse with its long axis twice the length of the short axis. Each wheel sub-orbit 315A-D may include two companion satellites, in some embodiments.

In order to uniformly populate the companion satellites, the angle of separation between adjacent satellites with respect to center satellite or point 305 in this reference frame may be 360 degrees divided by the number of companion satellites. For example, if there are 10 companion satellites, then there would be a companion satellite every 36 degrees. This way, each companion satellite may rotate around the center satellite.

Figure 4:
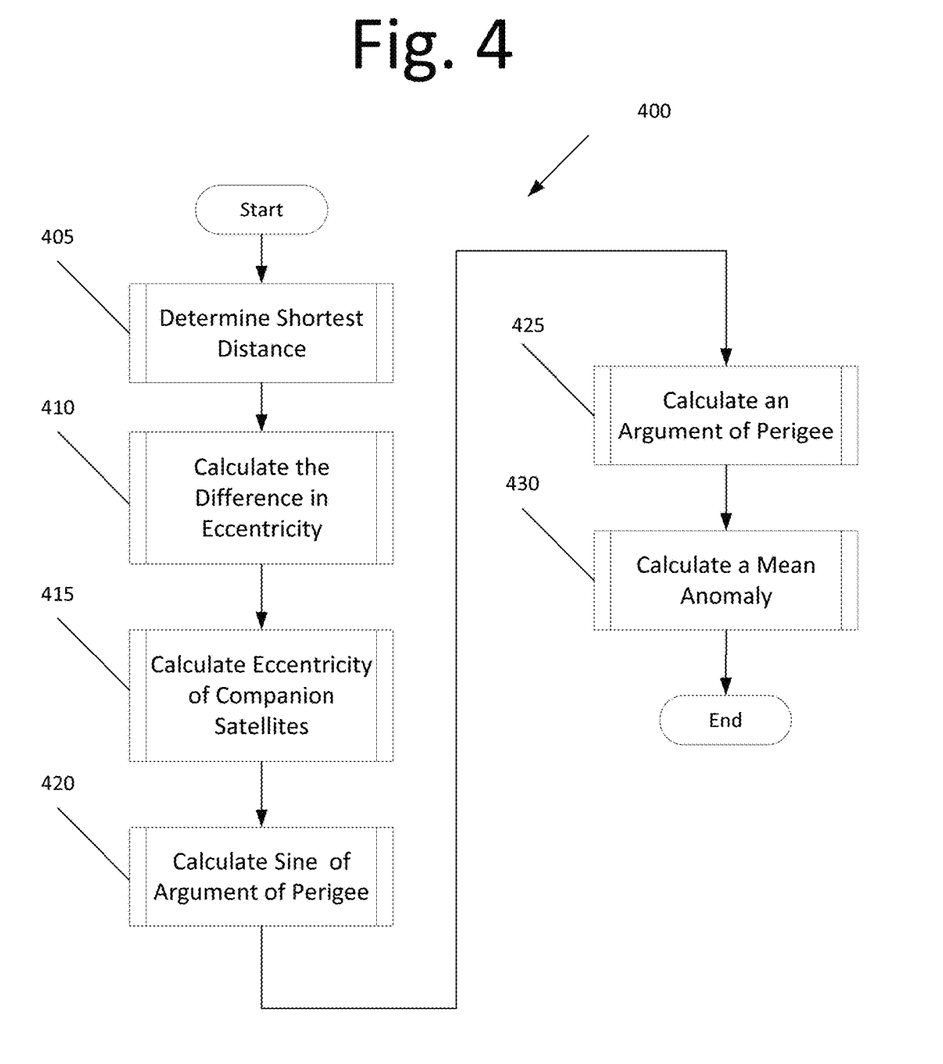
FIG. 4 is a flow diagram illustrating a process for computing orbit elements for each of the satellites, according to an embodiment of the present invention.

However, to deploy the companion satellites in orbit, an algorithm to compute the orbit elements of each of the companion satellites may be utilized. See, for example, FIG. 4, which is a flow diagram illustrating a process 400 for computing orbit elements for each of the satellites, according to an embodiment of the present invention. Process 400 may be executed by computing system 1000 of FIG. 10, for example. In some embodiments, process 400 begins at 405 with the computing system determining the shortest distance D between the center satellite and any of the companion satellites. Next at 410, the computing system calculates the difference in eccentricity Δe. This may be determined using the following equation:

$$\Delta e = D/a \qquad \text{Equation (1)}$$

where D is the shortest distance between a center satellite and any of the companion satellites, and a is an orbit semi-major axis, which is common to all satellite orbits. It should be appreciated that in some embodiments the length of the short axis of all the wheels in FIGS. 2 and 3 is 2D, and the length of the long axis is 4D. The size of the wheel may in certain embodiments be the key parameter in the design of a cluster formation. Wheel diameter may be the same as the long axis, thus setting shortest distance D, and finally, delta eccentricity Δe using Eq. (1). For example, embodiments where the collocation of two or more geostationary (GEO) satellites is applicable, shortest distance D is small enough to ensure that the cluster of satellites stay within the required station-keeping box, typically ±0.1 degree in longitude and latitude. For low-altitude satellite clusters, shortest distance D should be less than a certain limit due to onboard antenna power constrain or minimizing differential drag effects in the atmosphere.

At 415, the computing system calculates an eccentricity of the companion satellite $e_1$ using the following equation:

$$e_1 = (e^2 + \Delta e^2 - 2e\Delta e \cos(\beta))^{1/2} \qquad \text{Equation (2)}$$

where e is the orbit eccentricity of the center satellite, Δe is the difference in orbit eccentricity between the center satellite and the companion satellite, and β is the angular separation between two adjacent companion satellites in the satellite-centered reference frame. The above relation is derived from a vector difference between eccentricity vectors, which will be defined later in the subject application. For the simple case of one or two satellites moving around the center satellite, angular separation β is 0 or 180 degrees and Δe is the difference in orbit eccentricity between the center satellite and one of the companion satellites.

At 420, the computing system calculates the sine of argument of perigee S. The sine of argument of perigee S may be calculated using the following equation:

$$S = (\Delta e/e_1) * \sin(\beta) \qquad \text{Equation (3)}$$

By calculating the sine of argument of perigee S, the value of the argument of perigee of the companion satellite can be determined. The above relations, Equations (2) and (3), may be critical in determining the deployment of the companion satellite in some embodiments.

At 425, the computing system calculates an argument of perigee using the following equation:

$$\omega_1 = \sin^{-1}(S) + \omega \quad \text{Equation (4)}$$

where $\omega_1$ is the argument of perigee of the companion satellite orbit and $\omega$ is the argument of perigee of the center satellite.

At 430, the computing system calculates a mean anomaly $M_1$ of the companion satellite using the following equation:

$$M_1 = 360 - \sin^{-1}(S) \quad \text{Equation (5)}$$

By calculating the mean anomaly $M_1$, the location of the companion satellite can be determined, and the companion satellite can be deployed shortly thereafter. It should be appreciated that the above computation may be performed at perigee of the center satellite orbit, or when the mean anomaly M of the center satellite is 0, i.e., M=0.

It should be appreciated that the above flow diagram of FIG. 4 may be used to determine the deployment location for each companion satellite. It should be further appreciated that the new orbit elements of each companion satellite may include, but is not limited to, the orbit semi-major axis a, the eccentricity of the companion satellites $e_1$, the inclination i, right ascension of ascending node $\Omega$, argument of perigee $\omega_1$, and the mean anomaly $M_1$. In some embodiments, the orbit semi-major axis a, the inclination i, and the right ascension of ascending node $\Omega$ are the same as for the orbit of the center satellite. It should be appreciated that in some embodiments the initial difference in eccentricity, argument of perigee and mean anomaly between the center satellite and the companion satellite should be maintained throughout the entire mission to keep the desired wheel cluster formation. See, for example, the control process described below with respect to FIG. 9.

Figure 5:
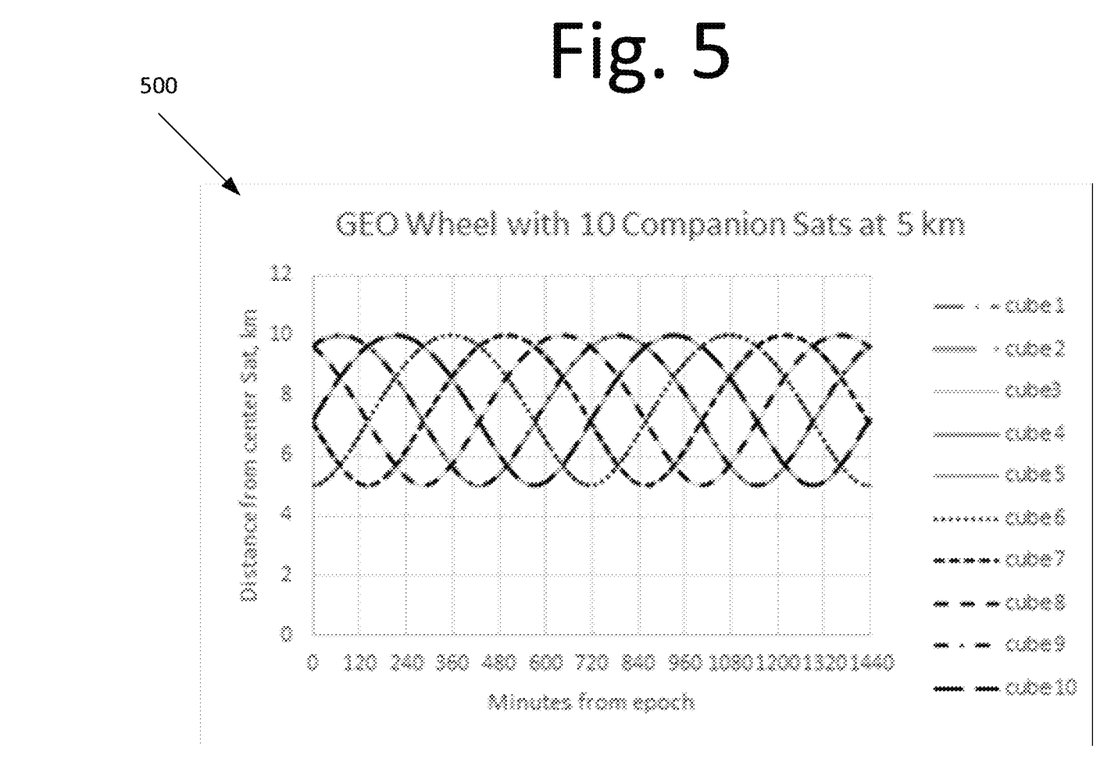
FIG. 5 is a graph illustrating a wheel cluster formation for 10 satellites, according to an embodiment of the present invention.

FIG. 5 is a graph 500 illustrating a wheel cluster formation for 10 satellites, according to an embodiment of the present invention. In this embodiment, graph 500 shows the history of the distance offset for 10 companion satellites relative to the center satellite in GEO for 24 hours (or 1440 minutes). In this example, graph 500 shows a variation between 5 kilometers and 10 kilometers following one cycle of each wheel sub-orbit.

Figure 6:
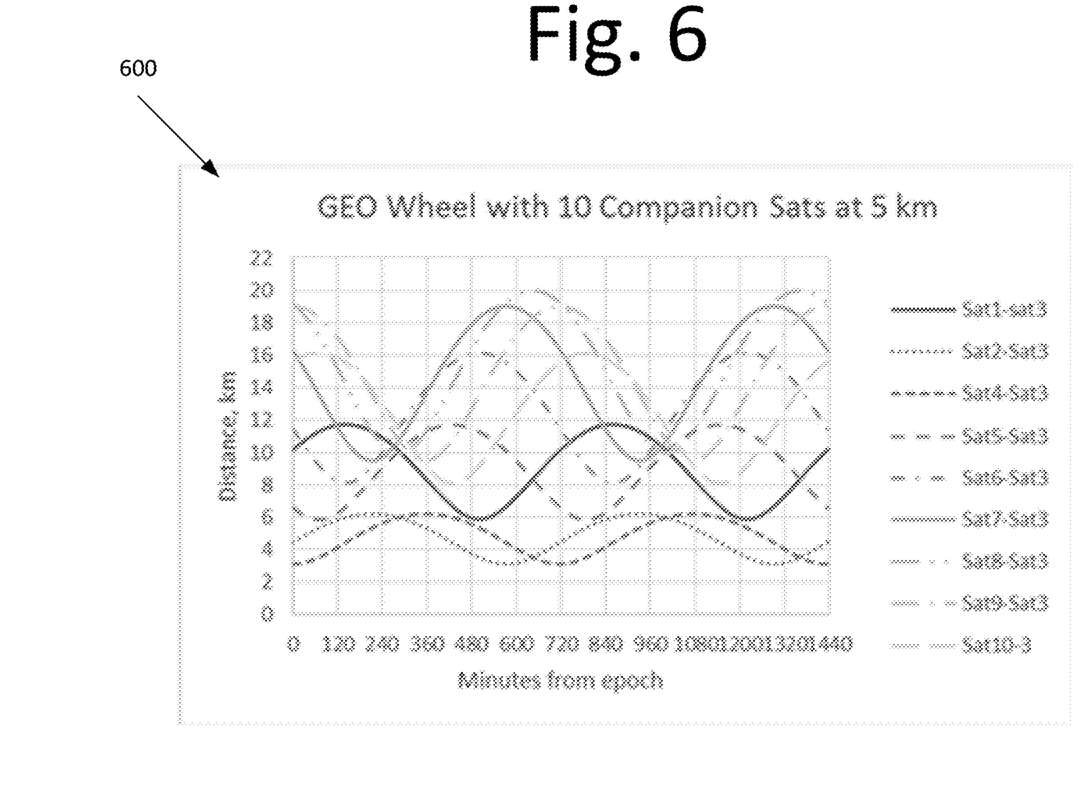
FIG. 6 is a graph illustrating a history of distances between a third satellite and other satellites, according to an embodiment of the present invention.

FIG. 6 is a graph 600 illustrating a history of distances between a third satellite and other satellites, according to an embodiment of the present invention. In this embodiment, graph 600 shows the distance history between companion satellite Sat3 and the other nine companion satellites during the same orbit period of 1440 minutes. In graph 600, the distance may be less than 5 kilometers and no greater than 20 kilometers between any two companion satellites. It should be appreciated that the above distance histories may be computed from simplified orbit relations without perturbing forces, such as Earth oblateness $J_2$ and Sun and/or Moon attractions. It should further be appreciated that the largest distance between any two satellites is 4D and shortest distance between any two satellites is 2D*sin ($\beta$/2). Also, this pattern of relative distance variation may repeat for every orbital period. For example, each sub-orbit may include two companion satellites separated by 180 degrees, and therefore, the paths of relative distance for the two companion satellites may coincide. To satisfy the sun-pointing strategy for GEO collocation applications, each sub-orbit may contain one companion satellite and the $\beta$ angle may be kept small in some embodiments. However, this constraint can be removed when the area-to-mass ratio of the companion satellites is small, e.g., less than 0.01 $m^2$/kg, when the solar-radiation induced eccentricity variation becomes insignificant.

Figure 7:
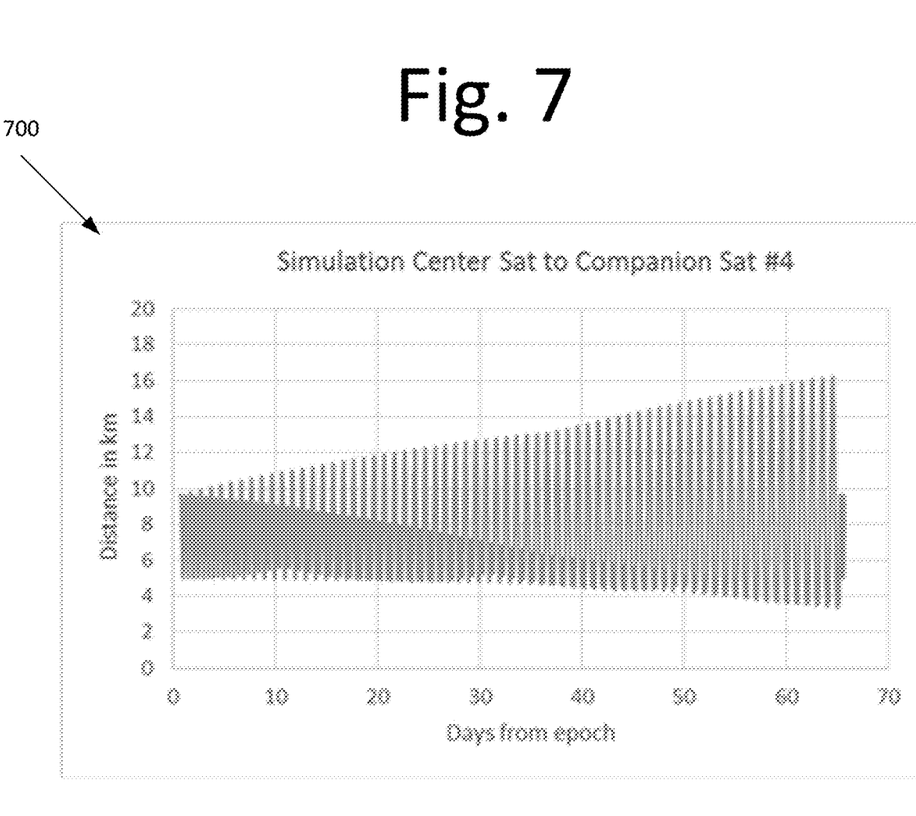
FIG. 7 is a graph illustrating a distance history between a center satellite and a fourth satellite under all perturbing forces, according to an embodiment of the present invention.
Figure 8:
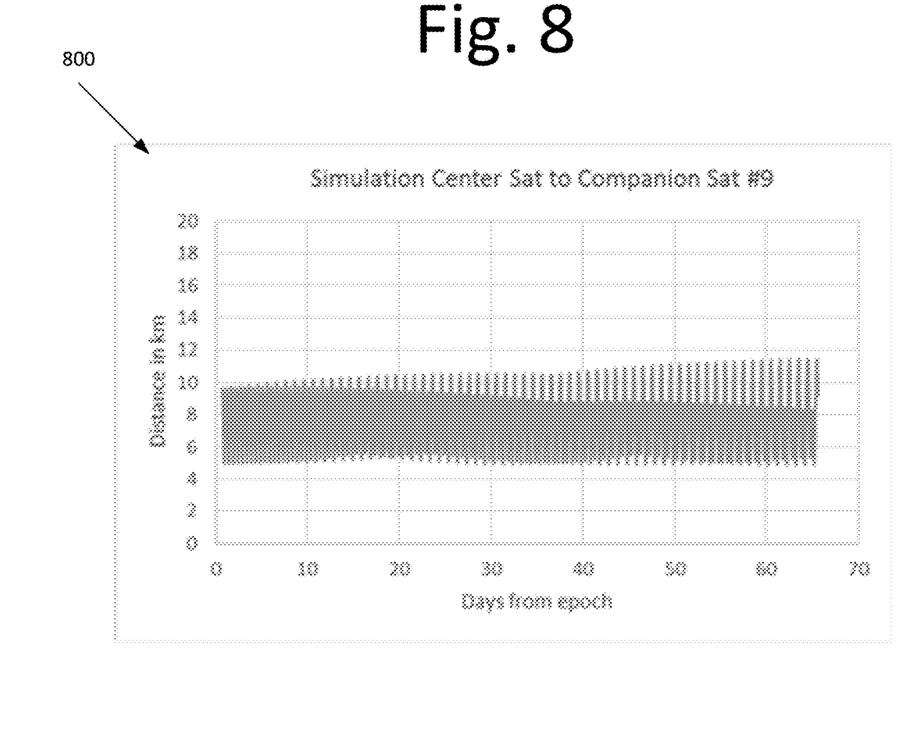
FIG. 8 is a graph illustrating a distance history between a center satellite and a ninth satellite under all perturbing forces, according to an embodiment of the present invention.

FIG. 7 is a graph 700 illustrating a distance history between a center satellite and a fourth satellite under simulated perturbing forces, according to an embodiment of the present invention. FIG. 8 is a graph 800 illustrating a distance history between a center satellite and a ninth satellite under simulated perturbing forces, according to an embodiment of the present invention. In graphs 700 and 800, the gradual increase in the distance between the fourth companion satellite (see FIG. 7) and the ninth companion satellite (see FIG. 8) reflects the effects from perturbing forces. In graph 700, for example, the effects of perturbing forces are more apparent. The slow deviations from the ideal formation suggest that proper orbit control or maneuvers are needed for each companion satellite after a predefined period of time.

Figure 9:
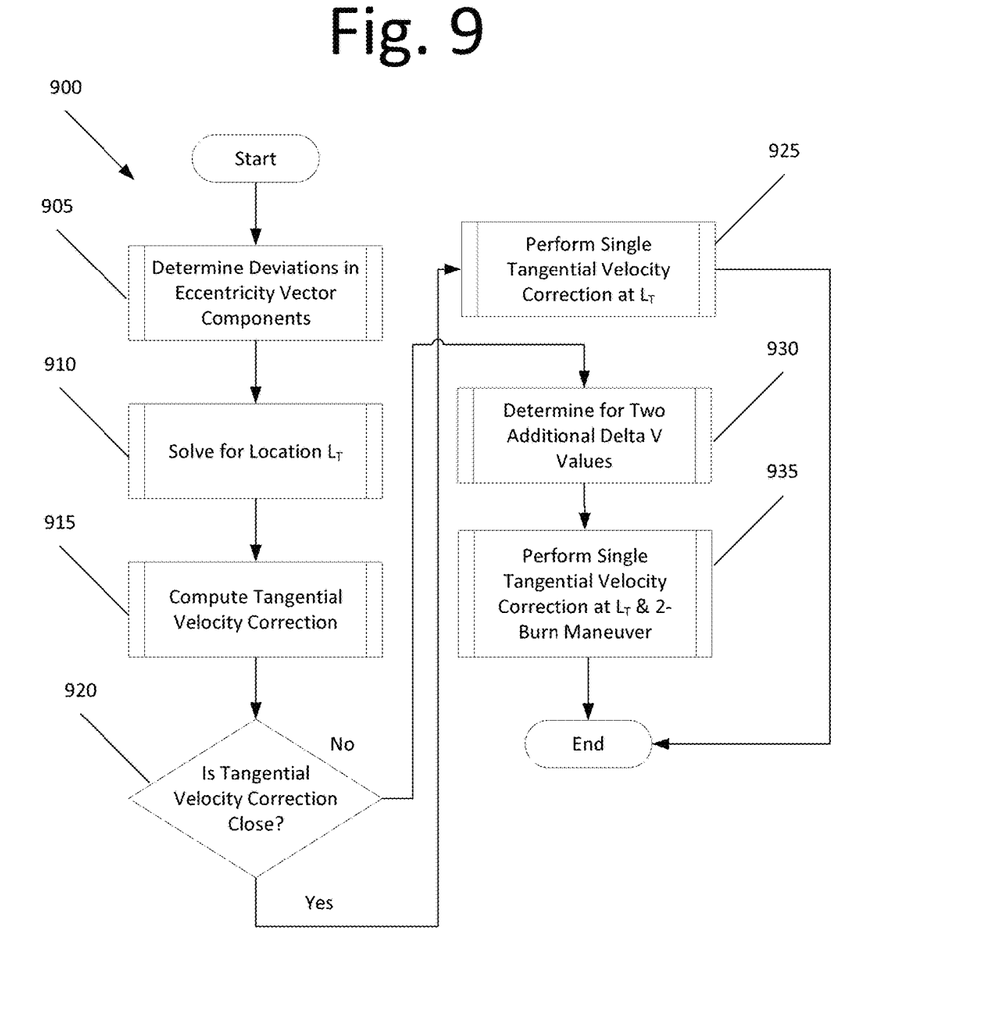
FIG. 9 is a flow diagram illustrating a process for correcting deviations in eccentricity and argument of perigee of a satellite's orbit, according to an embodiment of the present invention.

FIG. 9 is a flow diagram illustrating a process 900 for correcting deviations in eccentricity and argument of perigee of a companion satellite's orbit, according to an embodiment of the present invention. In this embodiment, process 900 is a control algorithm that adjusts or maneuvers the companion satellite after a predefined period of time to minimize the effects of perturbing forces. Adjustments may be performed after 10 days, one month, or any period of time depending on the requirements of the system. Larger acceptable deviations from the ideal case enable longer periods of time between station-keeping adjustments. For example, after 10 days, the control algorithm may apply a difference in tangential orbit velocity $\Delta V$ to maneuver the companion satellite along the wheel cluster formation. For purposes of explanation, $\Delta V$ may be applied in either positive or negative tangential direction. In some embodiments, equations for determining the magnitude and location of the difference in tangential orbit velocity $\Delta V$ may be used to correct deviations in eccentricity and argument of perigee for the companion satellite orbit. These equations relate to the difference in tangential orbit velocity $\Delta V$ along the orbit tangential direction to the resulting changes in the component of an eccentricity vector.

Figure 10:
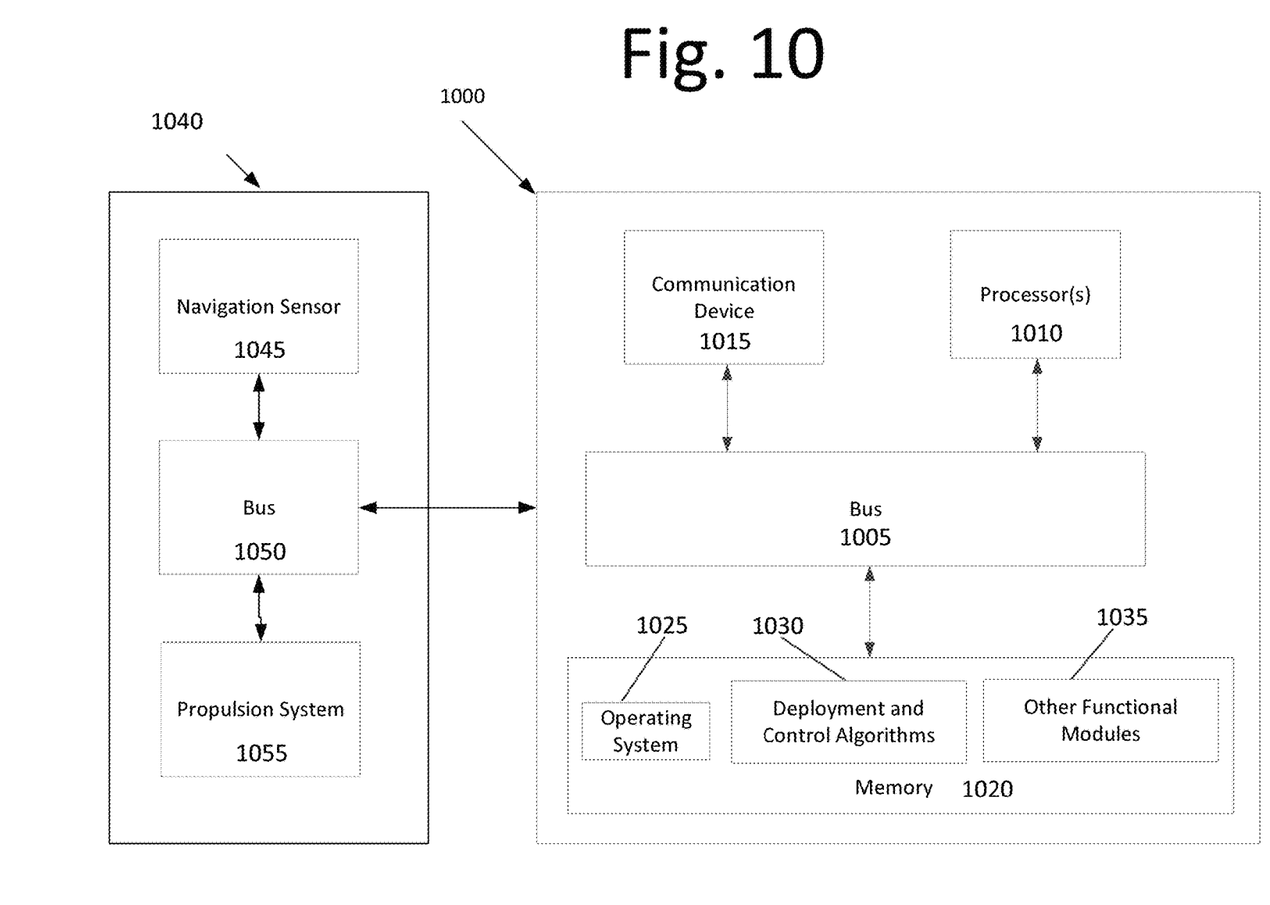
FIG. 10 is a block diagram illustrating a computing system for deployment and control of a satellite, according to one embodiment of the present invention.

It should be noted that process 900 may be executed by computing system 1000 of FIG. 10, for example. In some embodiments, eccentricity vector components $e_s$ and $e_c$ and location L are non-singular elements, and may be defined as $$e_c = e \cos(\omega + \Omega) \quad \text{Equation (6)}$$

$$e_s = e \sin(\omega + \Omega) \quad \text{Equation (7)}$$

$$L = \omega + \Omega + M \quad \text{Equation (8)}$$

Also, in some embodiments, the process may begin with the computing system (on board the small satellite) determining the deviations in eccentricity vector components $e_s$ and $e_c$ at 905. The following equations may compute small deviations of the eccentricity vector components of the companion satellite caused by the difference in perturbing forces between the center satellite and the companion satellite:

$$\Delta e_c = \Delta e_{cT} - \Delta e_{c0} \quad \text{Equation (9)}$$

$$\Delta e_s = \Delta e_{sT} - \Delta e_{s0} \quad \text{Equation (10)}$$

where $\Delta e_{cT}$ and $\Delta e_{sT}$ are the differences between the center satellite and the companion satellite at the time of station-keeping, while $\Delta e_{c0}$ and $\Delta e_{s0}$ are the desired differences at deployment. Once the two quantities, $\Delta e_{cT}$ and $\Delta e_{sT}$, are determined from an onboard navigation system (see FIG.

10), the station-keeping orbit velocity correction $\Delta V$ and the location of the maneuver can be determined using the following equations $$\Delta e_c = (2 \cos L_T) \Delta V / V \qquad \text{Equation (11)}$$

$$\Delta e_s = (2 \sin L_T) \Delta V / V \qquad \text{Equation (12)}$$

In some embodiments, V is the orbit velocity of the companion satellite at location $L_T$, i.e. the location where the small satellite should be maneuvered with a tangential orbit velocity correction $\Delta V$. Next, at 910, the computing system solves for location $L_T$ for applying the tangential orbit velocity correction $\Delta V$, using the following equation $$L_T = \tan^{-1}[\Delta e_s / \Delta e_c] \qquad \text{Equation (13)}$$

At 915, the computing system computes tangential velocity correction $\Delta V$ using either Equations (11) or (12). It should be appreciated that when the center satellite is a GEO satellite, the periodic longitude station-keeping maneuvers may be combined with the above maneuvers for the small satellite if the magnitudes of the two types (e.g., longitude station keeping or drag make up—meaning you have a lower altitude) of tangential orbit velocities $\Delta V$ are close to each other. For example, the two types may include longitude station keeping or drag make up depending on the orbit type (e.g., GEO or low Earth Orbit (LEO)). Depending on the embodiment, the longitude station-keeping maneuvers are normally applied at either perigee or apogee of a GEO satellite.

If the computing system determines that tangential orbit velocities $\Delta V$ are close to each other at 920, then the process continues to 925, and the computing system applies the tangential orbit velocity correction $\Delta V$ at location $L_T$.

If, however, the computing system determines that the tangential orbit velocities $\Delta V$s are not close to each other, then at 930, the computing system may determine (or solve for) the two additional tangential velocity correction values with the following equation:

$$\Delta V_1 = \Delta V_2 = \frac{\Delta V - \Delta V_a}{2} \qquad \text{Equation (14)}$$

where $\Delta V_1$ is the first additional tangential velocity correction after the computed tangential velocity correction $\Delta V$ is applied at location $L_T$, and $\Delta V_2$ is the second additional tangential velocity correction following first additional tangential velocity correction $\Delta V_1$. In some embodiments, first additional tangential velocity correction $\Delta V_1$ is applied at perigee and second additional tangential velocity correction $\Delta V_2$ is applied apogee separated by 180 degrees, while $\Delta V_a$ is the amount required for the longitude station-keeping or drag makeup maneuver. Tangential orbit velocity correction $\Delta V$ in some embodiments is the original value determined from Equation (11) or Equation (12) and Equation (13).

It should be appreciated that Equation (14) may be used when there are no longitude station-keeping or drag makeup maneuvers, or orbit velocity correction $\Delta V_a = 0$. In some embodiments, the frequency of maneuvers may depend on the perturbing force difference, the tolerance of minimum separation distance and the propulsion system of the companion satellite. In some other embodiments, if tangential velocity correction $\Delta V$ is 0 and orbit velocity correction $\Delta V_a$ is not equal to 0, Equation (14) may still be used.

Then, at 935, an additional two-burn maneuver with two additional tangential orbit velocity corrections $\Delta V_1$ and $\Delta V_2$ is applied along the negative tangential direction at perigee and apogee separated by 180 degrees.

In some embodiments, a GEO satellite may require north and south stationkeeping in addition to longitude station-keeping maneuvers. Then, all the companion satellites may apply the required out-of-plane velocity corrections in the same way as the center satellite.

In some embodiments, this station-keeping (or control) process may be applied to impulsive maneuvers with near circular orbits, where eccentricity less than 0.1. For electrical propulsion systems, such as pulsed plasma thruster, the control process may be extended to finite burns with durations depending on the $\Delta V$ magnitude and specific impulse value $I_{SP}$. For example, specific impulse $I_{SP}$ is the thrust divided by the mass flow rate into the thruster in an embodiment. Chemical thrusters may have a specific impulse value $I_{SP}$ ranging from 200 to 450 seconds, while electric thrusters have a specific impulse value $I_{SP}$ range from 300 to 10,000 seconds. Electric thrusters are far more propellant efficient than chemical thrusters, but are typically low-thrust devices that need to fire longer to produce a given $\Delta V$. For orbits with large eccentricity, such as Molniya and Tundra orbits, a two-burn argument of perigee control process with finite burns may be implemented. In this control process, the argument of perigee change $\Delta \omega$, is accomplished by two tangential velocity corrections, $\Delta V_1$ and $\Delta V_2$, which are applied at two locations in true anomaly, $\Theta_1$ and $\Theta_2$, determined from the following equation:

$$\Theta_i = \pm \cos^{-1}(-e) \pm \Delta \omega / 2 \qquad \text{Equation (15)}$$

The total velocity correction, $\Delta V$, may be computed by the following equation:

$$\Delta V = \Delta V_1 + \Delta V_2 = \Sigma[(1+e^2+2e \cos \Theta_i)^{1/2} nae] \Delta \omega / [2(1-e^2)^{1/2} \sin \Theta_i] \qquad \text{Equation (16)}$$

where the summation is from i=1 to 2 and n is the mean motion of the orbit; a and e are the semi-major axis and eccentricity of the center satellite, respectively. The $\Delta V_1$ is along the tangential velocity direction, while $\Delta V_2$ is along the negative tangential velocity direction in some embodiments. When the semi-major axis and/or eccentricity stationkeeping maneuvers are required, additional tangential velocity corrections, or $\Delta V_3$ and $\Delta V_4$, may be applied at perigee and apogee, respectively. In some embodiments, $\Delta V_3$ and $\Delta V_4$ may be determined from the vis-viva equation to give the required semi-major axis and eccentricity corrections.

FIG. 10 is a block diagram illustrating a computing system 1000 for deployment and control of a satellite, according to one embodiment of the present invention. Computing system 1000 may include a bus 1005 or other communication mechanism configured to communicate information, and at least one processor 1010, coupled to bus 1005, configured to process information. At least one processor 1010 can be any type of general or specific purpose processor. Computing system 1000 may also include memory 1020 configured to store information and instructions to be executed by at least one processor 1010. Memory 1020 can be comprised of any combination of random access memory ("RAM"), read only memory ("ROM"), static storage such as a magnetic or optical disk, or any other type of computer readable medium. Computing system 1000 may also include a communication device 1015, such as a network interface card, configured to provide access to a network.

The computer readable medium may be any available media that can be accessed by at least one processor 1010.

The computer readable medium may include both volatile and nonvolatile medium, removable and non-removable media, and communication media. The communication media may include computer readable instructions, data structures, program modules, or other data and may include any information delivery media.

According to some embodiments, memory 1020 may store software modules that may provide functionality when executed by at least one processor 1010. The modules can include an operating system 1025 and deployment and control algorithms 1030 for deploying satellites and controlling the satellites immediately or sometime thereafter, as well as other functional modules 1035. Operating system 1025 may provide operating system functionality for computing system 1000. Because computing system 1000 may be part of a larger system, computing system 1000 may include one or more additional functional modules 1035 to include the additional functionality.

Computing system 1000 may communicate with an onboard navigation system 1040 via bus 1050. Onboard navigation system 1040 may include an onboard navigation sensor 1045 that determines the relative position and velocity of each companion satellite with respect to the center satellite. Onboard navigation sensor 1045 may include, but is not limited to, global position system (GPS) receiver, a differential GPS receiver, pathfinder, or other sensors that would be appreciated by a person of ordinary skill in the art. Onboard navigation system 1040 may also include onboard propulsion system 1055, which may include chemical or electric thrusters along tangential and out-of-plane directions.

One skilled in the art will appreciate that a "system" could be embodied as a computing system on a satellite, a computing system at a ground station, a server, a console, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process shown in FIGS. 4 and 9 may be performed, in part, by a computer program, encoding instructions for a nonlinear adaptive processor to cause at least the process described in FIGS. 4 and 9 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIGS. 4 and 9, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Depending on the embodiment, the process shown in FIGS. 4 and 9 may be executed by a center satellite, one or more companion satellites, and/or ground station.

In some embodiments, an algorithm may populate a group of satellites around a center satellite together with a control algorithm to keep the satellites in close formation. The concept of using small eccentricity vector separation to place the satellites on multiple wheel shape sub-orbits gives desirable relative motion to the center satellite with safe separation distance among all the companion satellites. All of the companion satellites' orbits are in the same orbit plane of the center satellite with a common period. This way, the cluster formation can be controlled by simplified station-keeping strategies with reduced fuel requirement. This generalized wheel cluster formation may be applied at different orbits, such as LEO, medium Earth orbit (MEO), GEO, and highly elliptical orbit (HEO), at various altitudes, as well as, artificial satellite orbits around other planets.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process for controlling a companion satellite in a wheel orbit formation, comprising:
   determining, by at least one processor, one or more deviations in an orbit of the companion satellite; and
   controlling, by the at least one processor, the companion satellite to minimize effects of perturbing forces, wherein
   the determining of the one or more deviations comprises determining the one or more deviations in eccentricity vector components $e_s$ and $e_c$,
   the one or more deviations caused by a difference in the perturbing forces between a center satellite and the companion satellite.

2. The process of claim 1, wherein the determining the one or more deviations in eccentricity vector components $e_s$ and $e_c$ further comprises computing $$\Delta e_c = \Delta e_{cT} - \Delta e_{c0} \text{ and } \Delta e_s = \Delta e_{sT} - \Delta e_{s0}$$

where $\Delta e_c$ and $\Delta e_s$ are the one or more deviations in the eccentricity vector components, $\Delta e_{cT}$ and $\Delta e_{sT}$ are the differences between the center satellite and the companion satellite at a time of station-keeping, and $\Delta e_{c0}$ and $\Delta e_{s0}$ are the desired differences at deployment.

3. The process of claim 1, wherein the determining of the one or more deviations comprises computing $L_T = \tan^{-1}[\Delta e_s/\Delta e_c]$, where $L_T$ is for applying a tangential orbit velocity correction $\Delta V$.

4. The process of claim 1, wherein the determining of the one or more deviations comprises computing tangential velocity correction $\Delta V$.

5. The process of claim 4, further comprising:
   when the tangential orbit velocity correction $\Delta V$ are close, applying the tangential orbit velocity correction $\Delta V$ at location $L_T$.

6. The process of claim 5, further comprising:
   when the tangential orbit velocity correction $\Delta V$ are far apart, determining two additional tangential velocity correction values using $$\Delta V_1 = \Delta V_2 = \frac{\Delta V - \Delta V_a}{2}$$

where $\Delta V_1$ is a first additional tangential velocity correction after the computed tangential velocity correction $\Delta V$ is applied at location $L_T$, and $\Delta V_2$ is a second additional tangential velocity correction following the first additional tangential velocity correction $\Delta V_1$.

7. The process of claim 6, wherein the first additional tangential velocity correction $\Delta V_1$ is applied at perigee and the second additional tangential velocity correction $\Delta V_2$ is applied apogee separated by 180 degrees, while $\Delta V_a$ is the amount required for the longitude station-keeping or drag makeup maneuver.

8. The process of claim 1, wherein the controlling of the companion satellite comprises applying an additional two-burn maneuver with two additional tangential orbit velocity corrections $\Delta V_1$ and $\Delta V_2$ along a negative tangential direction at perigee and apogee separated by 180 degrees.

9. An apparatus for controlling a companion satellite in a wheel orbit formation, comprising:
   memory comprising a set of instructions; and
   at least one processor, wherein
   the set of instructions with the at least one processor causes the apparatus to
      determine one or more deviations in an orbit of the companion satellite, and
      control the companion satellite to minimize effects of perturbing forces, wherein
   the set of instructions with the at least one processor further causes the apparatus to determine the one or more deviations in eccentricity vector components $e_s$ and $e_c$,
   the one or more deviations caused by a difference in the perturbing forces between a center satellite and the companion satellite.

10. The apparatus of claim 9, wherein the set of instructions with the at least one processor further causes the apparatus to compute $$\Delta e_c = \Delta e_{cT} - \Delta e_{c0} \text{ and } \Delta e_s = \Delta e_{sT} - \Delta e_{s0}$$

where $\Delta e_c$ and $\Delta e_s$ are the one or more deviations in the eccentricity vector components, $\Delta e_{cT}$ and $\Delta e_{sT}$ are the differences between the center satellite and the companion satellite at a time of station-keeping, and $\Delta e_{c0}$ and $\Delta e_{s0}$ are the desired differences at deployment.

11. The apparatus of claim 9, wherein the set of instructions with the at least one processor further causes the apparatus to determine of the one or more deviations comprises computing $L_T = \tan^{-1}[\Delta e_s/\Delta e_c]$, where $L_T$ is for applying a tangential orbit velocity correction $\Delta V$.

12. The apparatus of claim 9, wherein the set of instructions with the at least one processor further causes the apparatus to compute tangential velocity correction $\Delta V$.

13. The apparatus of claim 12, wherein the set of instructions with the at least one processor further causes the apparatus to apply the tangential orbit velocity correction $\Delta V$ at location $L_T$, when the tangential orbit velocity correction $\Delta V$ are close.

14. The apparatus of claim 13, wherein the set of instructions with the at least one processor further causes the apparatus to determine two additional tangential velocity correction values using $$\Delta V_1 = \Delta V_2 = \frac{\Delta V - \Delta V_a}{2},$$

when the tangential orbit velocity correction $\Delta V$ are far apart,
where $\Delta V_1$ is a first additional tangential velocity correction after the computed tangential velocity correction $\Delta V$ is applied at location $L_T$, and $\Delta V_2$ is a second additional tangential velocity correction following the first additional tangential velocity correction $\Delta V_1$.

15. The apparatus of claim 14, wherein the first additional tangential velocity correction $\Delta V_1$ is applied at perigee and the second additional tangential velocity correction $\Delta V_2$ is applied apogee separated by 180 degrees, while $\Delta V_a$ is the amount required for the longitude station-keeping or drag makeup maneuver.

16. The apparatus of claim 9, wherein the set of instructions with the at least one processor further causes the apparatus to apply an additional two-burn maneuver with two additional tangential orbit velocity corrections $\Delta V_1$ and $\Delta V_2$ along a negative tangential direction at perigee and apogee separated by 180 degrees.

17. A computer program for controlling a companion satellite in a wheel cluster formation is embodied on a non-transitory computer-readable medium, the computer program, when executed, is configured to cause an apparatus to
determine one or more deviations in an orbit of the companion satellite; and
control the companion satellite to minimize effects of perturbing forces, wherein
the computer program is further configured to cause the apparatus to determine the one or more deviations in eccentricity vector components $e_s$ and $e_c$,
the one or more deviations caused by a difference in the perturbing forces between a center satellite and the companion satellite.

18. The computer program of claim 17, wherein the computer program is further configured to cause the apparatus to compute $$\Delta e_c = \Delta e_{cT} - \Delta e_{c0} \text{ and } \Delta e_s = \Delta e_{sT} - \Delta e_{s0}$$

where $\Delta e_c$ and $\Delta e_s$ are the one or more deviations in the eccentricity vector components, $\Delta e_{cT}$ and $\Delta e_{sT}$ are the differences between the center satellite and the companion satellite at a time of station-keeping, and $\Delta e_{c0}$ and $\Delta e_{s0}$ are the desired differences at deployment.

19. The computer program of claim 17, wherein the computer program is further configured to cause the apparatus to determine of the one or more deviations comprises computing $L_T = \tan^{-1}[\Delta e_s/\Delta e_c]$,
where $L_T$ is for applying a tangential orbit velocity correction $\Delta V$.

20. The computer program of claim 17, wherein the computer program is further configured to cause the apparatus to compute tangential velocity correction $\Delta V$.

21. The computer program of claim 20, wherein the computer program is further configured to cause the apparatus to apply the tangential orbit velocity correction $\Delta V$ at location $L_T$, when the tangential orbit velocity correction $\Delta V$ are close.

22. The computer program of claim 21, wherein the computer program is further configured to cause the apparatus to determine two additional tangential velocity correction values using $$\Delta V_1 = \Delta V_2 = \frac{\Delta V - \Delta V_a}{2},$$

when the tangential orbit velocity correction $\Delta V$ are far apart,
where $\Delta V_1$ is a first additional tangential velocity correction after the computed tangential velocity correction $\Delta V$ is applied at location $L_T$, and $\Delta V_2$ is a second additional tangential velocity correction following the first additional tangential velocity correction $\Delta V_1$.

23. The computer program of claim 22, wherein the first additional tangential velocity correction $\Delta V_1$ is applied at perigee and the second additional tangential velocity correction $\Delta V_2$ is applied apogee separated by 180 degrees, while $\Delta V_a$ is the amount required for the longitude station-keeping or drag makeup maneuver.

24. The computer program of claim 17, wherein the computer program is further configured to cause the apparatus to apply an additional two-burn maneuver with two additional tangential orbit velocity corrections $\Delta V_1$ and $\Delta V_2$ along a negative tangential direction at perigee and apogee separated by 180 degrees.

* * * * *